United States Patent [19]

Flaig

[11] 4,141,210
[45] Feb. 27, 1979

[54] BIPOLAR STEPPING MOTOR

[75] Inventor: Hans Flaig, Schramberg, Fed. Rep. of Germany

[73] Assignee: Februder Junghans GmbH, Schramberg, Fed. Rep. of Germany

[21] Appl. No.: 800,528

[22] Filed: May 25, 1977

[30] Foreign Application Priority Data

May 25, 1976 [DE] Fed. Rep. of Germany ....... 2623298

[51] Int. Cl.² .............................................. G04C 3/00
[52] U.S. Cl. ............................. 58/23 D; 310/40 MM; 310/49 R; 310/164; 310/267
[58] Field of Search ................ 58/23 D; 310/40 MM, 310/49 R, 156, 164, 267

[56] References Cited

U.S. PATENT DOCUMENTS

| 3,459,982 | 8/1969 | Cartier | 310/164 |
| 4,012,899 | 3/1977 | Matsuura et al. | 58/23 D |

Primary Examiner—Stanley J. Witkowski
Attorney, Agent, or Firm—Burns, Doane, Swecker & Mathis

[57] ABSTRACT

A bipolar stepping motor includes, a single stator sheet, an air gap between the ends of the stator sheet, a rotor between the ends of the stator sheet, and a coil which encompasses a portion of the stator sheet. The stator sheet is of essentially annular configuration and is surrounded over a substantial portion of its periphery by a coil carrier. The coil is applied on the carrier in the form of a ring core winding. A carrier plate is attached to the stator sheet in the vicinity of the air gap. This plate carries a shaft of the rotor and serves as means for attaching the motor to another structure.

7 Claims, 2 Drawing Figures

BIPOLAR STEPPING MOTOR

BACKGROUND AND OBJECTS

The invention relates to a bipolar stepping motor, especially for use as a watch drive, and particularly concerns a motor having a single stator sheet, a rotor, an air gap between the two which is not uniform, and a coil partially surrounding the stator sheet.

A stepping motor of the previously described type has already become known from the addition to French patent 73,591 (FIG. 1 thereof). The stator shown there carries on its straight connecting element a coil between the legs of the stator. This connecting element passes over at a right angle into straight partial pieces of the stator legs. Even though the known motor is shown as consisting of a single stator part in the above-mentioned patent, in practice nevertheless these stators hitherto have been composed of several partial pieces in order to be able to wind the straight connecting piece in a simple manner. The connecting piece was then customarily rivetted together with the straight partial pieces of the stator legs. In such stators, for one thing, the losses due to scatter are quite considerable because of the partially rectangular configuration. For another thing, the body of the coil, and thus the winding space, is being dimensioned at an optimally large dimension. Thus the degree of effectiveness is not optimal either.

It is an object of the invention, starting out from the previously designated status of the prior art, to create a bipolar stepping motor which, based on a consideraly improved degree of effectiveness, has a higher torque.

BRIEF SUMMARY

These and other objects are achieved by a bipolar stepping motor which includes a single stator sheet, an air gap between the ends of the stator sheet, a rotor between the ends of the stator sheet, and a coil which encompasses a portion of the stator sheet. The stator sheet is of essentially annular configuration and is surrounded over a substantial portion of its periphery by a coil carrier. The coil is applied on the carrier in the form of a ring core winding. A carrier plate is attached to the stator sheet in the vicinity of the air gap. This plate carries a shaft of the rotor and serves as means for attaching the motor to another structure.

THE DRAWING

The invention is to be explained in more detail in the following paragraphs on the basis of the drawing of a preferred embodiment shown by way of example, wherein.

DETAILED DESCRIPTION

Figure 1:
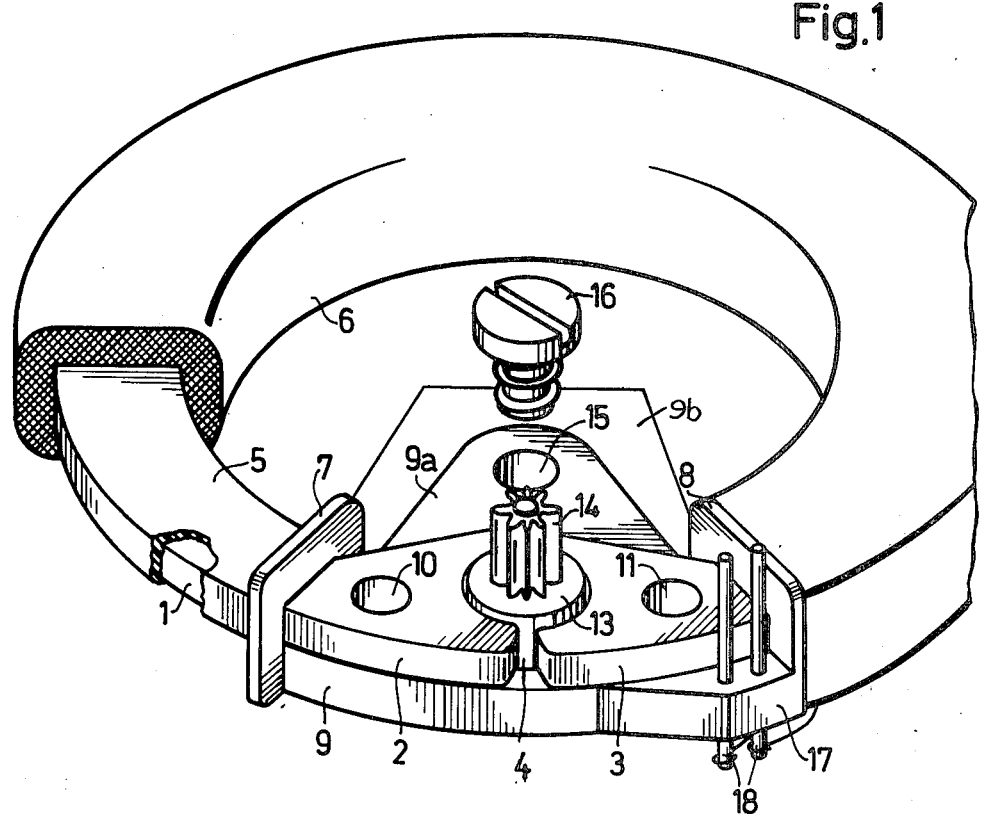
FIG. 1 is a perspective view of the motor according to the invention.

An annularly developed single stator sheet or member 1 which in the area of the rotor ends in two broadened stator legs 2 and 3, is the essential element of the new motor. The stator sheet 1 may comprise a package of individual sheet metal laminae which are curved into the circular configuration. The stator sheet is of one piece construction in the sense that it is one piece from end to end. The legs 2, 3 are separated from one another by a non-constant air gap 4. The annular stator sheet is formed in places, e.g., as by being extrusion coated over a substantial part of its periphery (perferably about 270°) with a plastic sleeve-like coil carrier body 5, such formed-in-place body 5 constituting a coating which serves as a carrier for a coil 6 made in the form of a ring core winding. For the limitation and support of the coil on the coil body, there are flanges 7 and 8 formed onto the latter.

Figure 2:
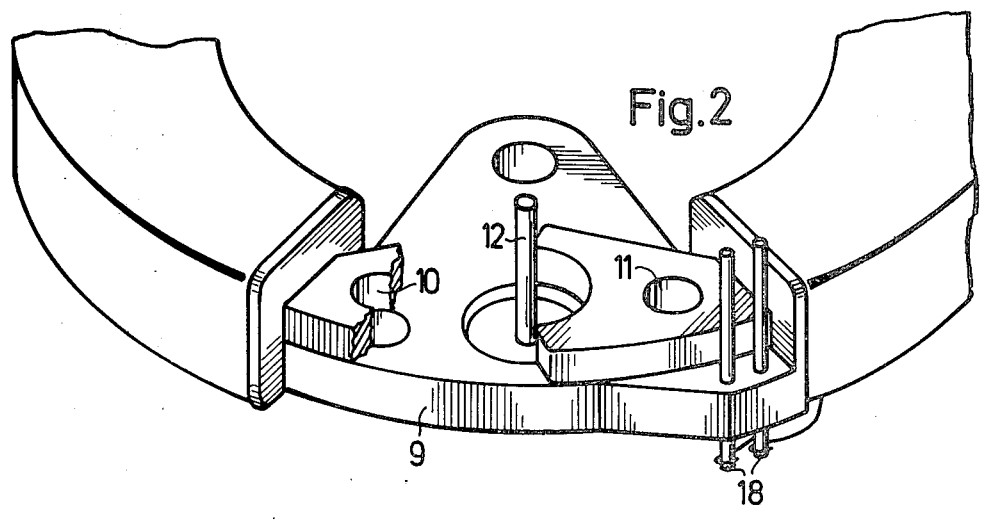
FIG. 2 is a perspective presentation of a part of the motor, with a stator leg partially broken away.

A carrier plate 9 made of insulating material, such as plastic, and forming a part of the coil carrier body is attached to the two stator legs. Holes 10 and 11 serve for connecting the motor to another structure such as a watch housing. In the carrier plate, as can be recognized from FIG. 2, a shaft 12 is attached on which a multipolar, permanently magnetic rotor 13 has been mounted rotatably. The rotor is disposed between the legs of the stator sheet. A driving pinion 14 is rigidly connected with the rotor, and serves to drive the gear mechanism of a watch.

The carrier plate 9 has a bore 15 through which a screw 16 may be disposed for the connection of the carrier plate and motor to a structure 96, such as a watch housing.

A carrier piece 17 has been formed onto the flange 8 of the coil body, in which piece 17 two metal pins 18 are fixed. On these pins 18 are situated the two connections of the coil wire. The coil 6 is connected electrically with the electronic block of the movement by means of these metal pins 18.

Insofar as it is sometimes not desirable for reasons of space that the carrier plate 9 project into the inside space of the coil body, it will also be possible within the scope of the invention, to direct this part 9a of the carrier plate to the outside, i.e., outside of the ring of the coil body. In any case, however, it is also possible to develop the carrier plate so that it will serve also for the mounting of the entire, or at least of a part, of the gear mechanism of the watch.

Even though the winding of the coil in the case of the motor of the present invention may be more difficult than in the case of a straight coil body, nevertheless this factor increasing the costs will be compensated by the fact that the remaining construction of the motor is very simple and economical. As a result of the round coil body and the coil which is large in relation to the size of the motor however, the essential advantage will be achieved, that the torque of the motor is considerably higher on the basis of a degree of effectiveness, which is considerably better as compared to former similar motors.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. In a bipolar stepping motor, especially for use in watches, including a stator member having opposite ends, said stator member being of one-piece construction from one of said ends to the other, said ends being spaced to form an air gap between the ends of the stator member, a rotor disposed between the ends of the stator member and forming a nonconstant air gap with those ends, said rotor including a shaft, and a coil encompassing a portion of the stator member, said one-piece stator member is of annular configuration, a coil carrier surrounding said stator member over a substantial portion of its end-to-end extent, said coil being applied on said carrier to define a ring core winding, a carrier plate attached to the stator member adjacent said air gap, said plate carrying said shaft of the rotor and serving as means for attaching the motor to another structure.

2. A motor according to claim 1, wherein the carrier plate comprises insulating material and metal pins being carried by said carrier plate and being connected with terminals of said coil.

3. A motor according to claim 1, wherein the coil carrier comprises a formed-in-place coating.

4. A motor according to claim 1, in that the stator member comprises a plurality of individual sheet metal laminae having opposed sets of ends, one of said sets of ends forming one of said ends of said stator member, the other of said sets of ends forming the other of said ends of said stator member.

5. A motor according to claim 1, wherein said coil carrier and said coil extend substantially 270 degrees around said stator member.

6. A motor according to claim 1, wherein said coil includes opposite ends, said carrier plate connected between said ends of said coil on a side of said air gap opposite said shaft.

7. A motor according to claim 1, wherein said carrier plate is situated beneath said air gap and extends radially inwardly relative to said annular stator member, and said shaft is non-rotatably carried by said carrier plate.

* * * * *